April 21, 1931.    S. P. AMBROSE    1,801,895
SCOOTER
Filed May 22, 1929
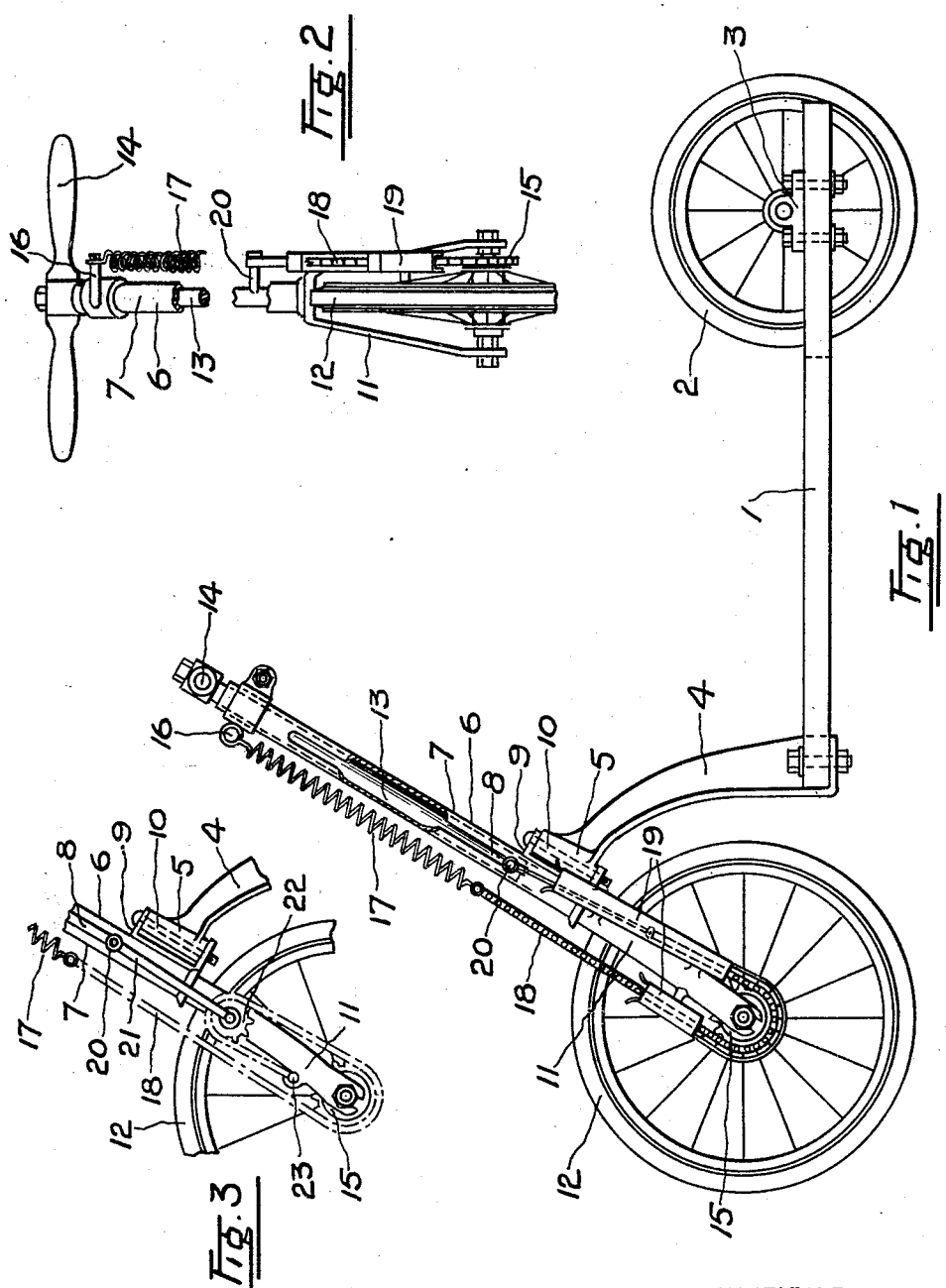
INVENTOR
SEWELL POWIS AMBROSE
BY
Featherstonhaugh & Co
ATTORNEYS Patented Apr. 21, 1931

1,801,895

UNITED STATES PATENT OFFICE

SEWELL POWIS AMBROSE, OF VANCOUVER, BRITISH COLUMBIA, CANADA

SCOOTER

Application filed May 22, 1929. Serial No. 365,105.

My invention relates to improvements in scooters, the objects of which are to provide means whereby the toy can be propelled by the use of the user's arms, so that his feet may remain upon the scooter platform and also to provide means whereby the driving force imparted to the scooter shall be applied to the front wheel only so as to prevent any tendency for the front wheel to lift during the driving stroke.

The invention consists essentially of a scooter having a telescopic steering column surmounting its front wheel and means connected with the upper portion of said column and the front wheel whereby motion is imparted to the wheel on one stroke of the said portion of the column, as will be more fully described in the following specification, and shown in the accompanying drawings, in which:—

Fig. 1 is a general side view of the invention.

Fig. 2 is a front view.

Fig. 3 is a fragmentary view of the driving mechanism in modified form arranged to increase the gear ratio between the power applied and the front wheel.

In the drawings like characters of reference indicate corresponding parts in each figure.

The numeral 1 indicates generally a platform slotted from its rear extremity in the usual manner to accommodate a rear wheel 2 which is journalled between a pair of blocks 3 secured to the platform. Secured to the forward end of the platform is an overhanging bracket 4 having a tubular head 5.

The numeral 6 indicates generally a steering column which consists of a tubular member 7 having an elongated slot 8 on one side, the purpose of which will hereinafter appear.

Secured to the rear of the column 6 is a U-shaped bracket 9 which is connected to the tubular head 5 of the bracket 4 with a king pin 10 to permit the column to be turned in either direction. Mounted at the base of the column 6 is a fork 11 between which a front wheel 12 is journalled in any suitable manner.

Slidably fitted into the tubular member 7 is a post 13 having a pair of handle bars 14 transversely mounted upon its upper extremity. The front wheel 12 is fitted with a free wheel sprocket 15 of any suitable type, which is adapted to impart rotation to the wheel when rotated in an anticlockwise direction and to have non-driving engagement therewith when rotated in a clockwise direction.

A sidewise projecting arm 16 is mounted adjacent the upper end of the tubular member 7 to provide an anchorage for one end of a tension spring 17, which spring is connected at its lower extremity to a drive chain 18 which is passed around the underside of the sprocket 15 through a pair of guides 19 secured to the fork 11 and is connected at its opposite end to an arm 20 extending from the side of the post 13 through the slot 8.

In the modification shown in Figure 3 an extension rod 21 is fitted to the arm 20 and is provided at its lower extremity with a sprocket 22 and the chain 18 after passing around the underside of the sprocket 15 passes around the upper side of the sprocket 22 and is secured to a pin 23 extending outwards from the fork 11 so that an increased gear ratio is obtained over that shown in Figures 1 and 2 thus providing a chain movement equal to twice the endwise movement of the post 13 and a higher vehicle speed is developed from a given reciprocation of the handlebars.

Having thus described the several parts of my invention I will now briefly explain its use.

The user places both feet upon the platform 1, grips the handlebars 14 and uses them for steering purposes in the usual way. As he exerts an upward pull on the handlebars to slidably raise the post 13 in the tubular member 7, one end of the chain 18 is drawn in the direction of movement of the post and rotation is imparted through the sprocket 15 to the wheel 12. On thrusting the post downwards the spring 17 moves the chain and the sprocket in the opposite direction and by reason of the free wheel mechanism associated with the sprocket permits the wheel 12 to continue its rotation while the momentum of the scooter is sustained.

What I claim as my invention is:

1. In a scooter having road wheels, one of which is mounted in a steering column for steering purposes, handle bars slidable longitudinally of the column, a free wheel sprocket operatively connected with one of the wheels, a chain passing around said wheel, and connected to the handle bars whereby movement of the handlebars in one direction draws the chain and imparts rotation through the sprocket to said wheel and means for reversing the movement of the chain incident to the movement of the handlebars in an opposite direction.

2. In a scooter having road wheels, one of which is mounted in a steering column, a free wheel sprocket operatively connected with one of the wheels, a post, handlebars connected to said post having telescopic engagement with the steering column, a chain in mesh with the sprocket connected at one end to the steering column and a spring secured to the other end, said spring being anchored to the steering column.

Dated at Vancouver, B. C., this 6th day of May, 1929.

SEWELL POWIS AMBROSE.